(12) United States Patent
Carignan

(10) Patent No.: US 9,395,256 B2
(45) Date of Patent: Jul. 19, 2016

(54) LOW PROFILE MULTI-AXIS LOAD CELL

(71) Applicant: Advanced Mechanical Technology, Inc., Watertown, MA (US)

(72) Inventor: Forest J. Carignan, Bedford, MA (US)

(73) Assignee: Advanced Mechanical Technology, Inc., Watertown, MA (US)

( * ) Notice: Subject to any disclaimer, the term of this patent is extended or adjusted under 35 U.S.C. 154(b) by 0 days.

(21) Appl. No.: 14/564,749

(22) Filed: Dec. 9, 2014

(65) Prior Publication Data

US 2015/0160081 A1 Jun. 11, 2015

Related U.S. Application Data

(60) Provisional application No. 61/914,759, filed on Dec. 11, 2013.

(51) Int. Cl.
*G01D 7/00* (2006.01)
*G01L 5/16* (2006.01)

(52) U.S. Cl.
CPC ........... *G01L 5/161* (2013.01); *Y10T 29/49103* (2015.01)

(58) Field of Classification Search
CPC .......................... Y10T 29/49103; G01L 5/161
USPC ............................ 73/862.041–862.046, 856
See application file for complete search history.

(56) References Cited

U.S. PATENT DOCUMENTS

| | | | | |
|---|---|---|---|---|
| 4,166,997 A * | 9/1979 | Kistler | ................. | G01L 1/2231 338/5 |
| 4,493,220 A | 1/1985 | Carignan et al. | | |
| 5,201,218 A * | 4/1993 | Mole | ..................... | G01M 9/062 338/2 |
| 5,222,399 A * | 6/1993 | Kropp | .................. | F16B 31/028 177/210 R |
| 5,315,882 A * | 5/1994 | Meyer | ..................... | G01L 5/161 73/862.042 |
| 5,814,740 A | 9/1998 | Cook et al. | | |
| 5,894,094 A * | 4/1999 | Kuchler | ............... | G01L 1/2262 73/146 |
| 6,253,626 B1 * | 7/2001 | Shoberg | ................. | G01L 5/161 73/775 |
| 6,370,971 B1 * | 4/2002 | Olson | .................. | G01L 1/2225 73/862.634 |

(Continued)

OTHER PUBLICATIONS

Lowe, Philip J., "Knee Mechanism Performance in Amputee Activity", cover page, table of contents, pp. i-iii and 73-83, published May 1969.

(Continued)

*Primary Examiner* — Max Noori
(74) *Attorney, Agent, or Firm* — Hamilton, Brook, Smith & Reynolds, P.C.

(57) ABSTRACT

A compact multi-axis load cell with opposing rigid mounting elements includes annular flanges at the perimeter of the elements. A sensing region is formed between the rigid mounting elements by bonding, as by welding or brazing, opposing annular flanges at their end surfaces. To increase the mass and rigidity of the opposing mounting elements, the annular flanges may be partially formed by a peripheral groove, the groove defining a portion of an inside surface of the annular flange. The peripheral groove provides sufficient flange length for affixing strain gauges while positioning internal surfaces of the mounting elements close together in order to reduce the overall length of the load cell. Sensing circuits affixed to the outside surface of the sensing region provide output signals responsive to forces and moments exerted between the rigid mounting elements in at least two substantially perpendicular directions.

22 Claims, 5 Drawing Sheets

(56) References Cited

U.S. PATENT DOCUMENTS

| | | | | |
|---|---|---|---|---|
| 6,957,588 B1 * | 10/2005 | Kicher | ............... | G01L 9/0002 |
| | | | | 73/720 |
| 7,743,672 B2 * | 6/2010 | Kurtz | ............... | G01L 3/1457 |
| | | | | 73/862.041 |
| 8,250,935 B2 * | 8/2012 | Meuter | ............... | G01L 3/1457 |
| | | | | 73/862.045 |

OTHER PUBLICATIONS

Lowe, Philip J., "Knee Mechanism Performance in Amputee Activity", cover page, table of contents, pp. i-iii and 73-83, published in 1969.†

\* cited by examiner
† cited by third party

LOW PROFILE MULTI-AXIS LOAD CELL

RELATED APPLICATION(S)

This application claims the benefit of U.S. Provisional Application No. 61/914,759, filed on Dec. 11, 2013. The entire teachings of the above application are incorporated herein by reference.

BACKGROUND OF THE INVENTION

A load cell is a transducer that is used to convert a force into an electrical signal. This conversion is indirect and happens in two stages. Through a mechanical arrangement, the force being sensed deforms a strain gauge. The strain gauge measures the deformation (strain) as an electrical signal, because the strain changes the effective electrical resistance of the wire. A load cell usually includes four strain gauges in a Wheatstone bridge configuration. Load cells of one strain gauge (quarter bridge) or two strain gauges (half bridge) are also available. The electrical signal output is typically in the order of a few millivolts and requires amplification by an instrumentation amplifier before it can be used. The output of the transducer can be scaled to calculate the force applied to the transducer. The various types of load cells that exist include Hydraulic load cells, Pneumatic load cells and Strain gauge load cells.

Strain gauge load cells are the most common in industry. These load cells are particularly stiff, have very good resonance values, and tend to have long life cycles in application. Strain gauge load cells work on the principle that the strain gauge (a planar resistor) deforms/stretches/contracts when the material of the load cells deforms appropriately. These values are extremely small and are relational to the stress and/or strain that the material load cell is undergoing at the time. The change in resistance of the strain gauge provides an electrical value change that is calibrated to the load placed on the load cell. Typically, strain gauges are formed from resistors in a Wheatstone bridge configuration. A Wheatstone bridge is an electrical circuit used to measure and unknown resistance by balancing two legs of a bridge circuit. One leg of which contains the unknown value. Wheatstone bridges are made up of four resistors or loads in a square with a voltage meter bridging two corners of the square and power/ground connected to the other corners. In the case of a load cell, these resistors are strain gauges.

The present invention relates to a load cell that transmits and measures linear forces along and moments about up to three orthogonal axes. More particularly, a compact load cell body is disclosed for maximizing the rigidity ratio of the load cell body to the load cell sensing region.

SUMMARY OF THE INVENTION

The present invention relates to a low profile multi axis load cell (also referred to as a force transducer) which measures forces and moments about multiple independent axes. The multi-axis load cell is constructed from two joined pieces, mounting elements, preferably welded together, with a thin-walled sensing region positioned between them. Preferably, a portion of the internal wall of the thin-walled sensing region is formed from a groove cut into the internal surface of each mount element. The two-part design and the groove provide a sensing region of necessary axial length to accurately measure forces and moments, while minimizing the amount of internal space between the two mounting elements and, therefore, maximizing the mounting element rigidity for a given overall load cell axial length.

An exemplary embodiment of the present invention is a multi-axis load cell comprising first and second rigid mounting elements; each of the first and second rigid mounting elements has an internal end and an external end. At least one of the rigid mounting elements has an annular flange at the perimeter of the internal end of the element, the annular flange extends a length parallel to a central axis, the flange terminates at an end surface. The internal ends of the first and second cylindrical elements are bonded together at the end surface of the annular flange of the at least one of the rigid mounting elements, the flange forms a sensing region between the first and second rigid mounting elements.

In a preferred embodiment of the present invention, the first and second rigid mounting elements of the multi-axis load cell are rigid cylindrical mounting elements, with the annular flange positioned on at least one the mounting elements. In another embodiment, the internal ends of the first and second cylindrical elements are adhered together in a coaxial relationship.

In some embodiments of the present invention, internal ends of the first and second elements of a multi-axis load call are adhered together by welding or brazing the end surface of the at least one annular flange.

Embodiments of the present invention include a multi-axis load cell wherein the at least one of the rigid mounting elements has an annular flange partially formed by a cylindrical groove, the groove defining a portion of an inside surface of the annular flange. In a preferred embodiment, the groove is formed by trepanning the internal end of the rigid mounting elements having an annular flange.

In some embodiments of the present invention, first and second rigid cylindrical mounting elements of the multi-axis load cell have respective first and second annular flanges adhered at their end surfaces, the first and second annular flanges form a sensing region. In some embodiments, strain gauges are affixed to the sensing region.

Another embodiment of the present invention includes a multi-axis load cell wherein the sensing region has an outside surface directed away from the central axis of the first and second elements, the outside surface of the sensing region supporting a first sensing circuit formed of a first set of sensing elements and providing a first output signal responsive to a first force exerted between the first and second rigid mounting elements in a first direction, and a second sensing circuit formed of a second set of sensing elements and providing a second output signal responsive to a second force exerted between the first and second rigid mounting elements in a second direction, wherein the second direction is substantially perpendicular to the first direction. The first output signal may be response to a first moment of the first and second rigid mounting elements. The second output signal may be response to a second moment of the first and second rigid mounting elements.

The multi-axis load cell according to embodiments of the present invention may include at least one electrical connector receiving the first and second output signals, the electrical connector configured to interface the multi-axis force transducer with an external electric device.

In another embodiment, multi-axis load cell includes mounting features on at least one of the first and second rigid mounting elements.

In some embodiments of the present invention, the internal and external ends of the first rigid mounting element comprises a first pair of surfaces facing in opposite directions and the internal and external ends of the second rigid mounting element comprises a second pair of surfaces facing in opposite directions, the second set of surfaces being substantially parallel to the first set of surfaces. The first and second rigid mounting elements may have about equal stiffness. The sensing region has a stiffness substantially less than the stiffness of the first and second rigid mounting elements. The axial distance between the first pair of surfaces may be about equal to the axial distance between the second pair of surfaces.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Transducers or load cells for determining forces along and moments about three orthogonal axes are known. One such load cells is disclosed in U.S. Pat. No. 4,493,220, which is incorporated by reference in its entirety. U.S. Pat. No. 4,493,220 illustrates a cylindrical load transducer that measures linear forces and moments about multiple axes, dependent on the placement of the strain gauges. The design of U.S. Pat. No. 4,493,220 is typical for a multiple axis load-sensitive transducer having attached strain gauges. The strain gauges are affixed to the outer surface of a thin-walled sensing section of the cylindrical tube to measures forces and moments transmitted though the section. This prior art construction uses a one-piece cylindrical tube with one end having a larger diameter opening to allow interior machining of the thin-walled sensing section. To rigidly affix both ends of this prior art system, a large plug is inserted into the open of the load cell, necessitating a mounting element of sufficient length to accept a plug capable of rigidly transferring forces and moments to the cylindrical tube.

There is an ongoing need to provide an improved compact load cell that can measure components of forces and moments in plural directions and yet be easy to manufacture. Preferably, a load cell body of the load cell should maximize the ratio between mounting element rigidity and sensing region rigidity for a given load cell length and sensing region thickness.

Figure 1B:
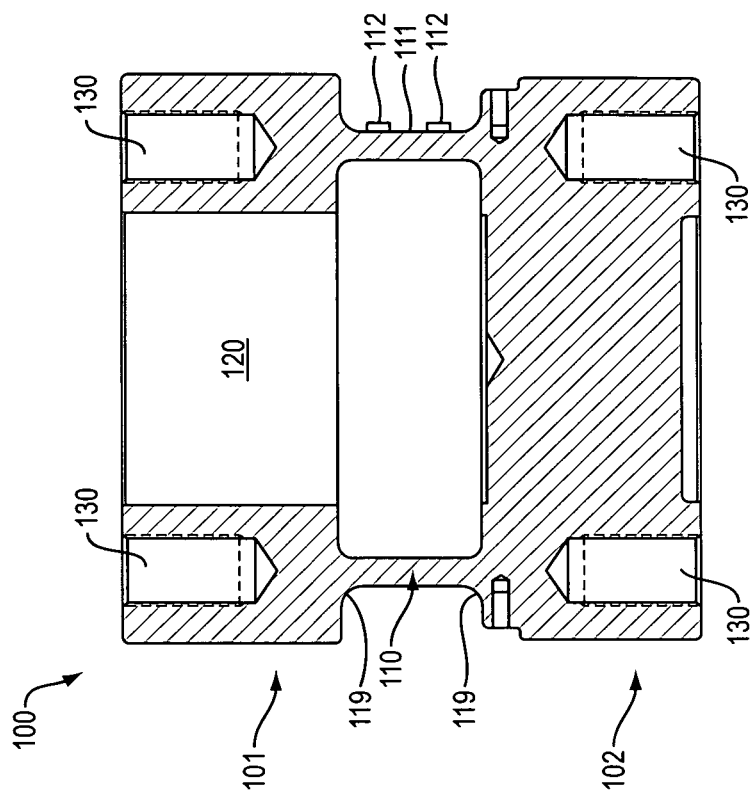
FIGS. 1A-B are schematics of a prior art multi-axes load cell having a cylindrical one-piece construction.
Figure 1A:
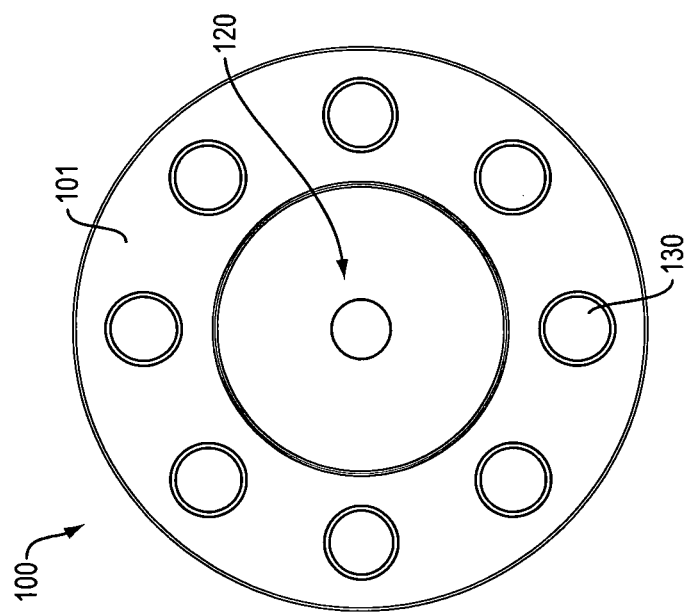

Cylindrical sensing elements have been used for decades as the deflecting element for strain gage single or multi-axis load cells. They have characteristics that make them particularly suited to low crosstalk six channel (Fx, Fy, Fz, Mx, My, Mz) measurements with six independent strain gage bridges. FIG. 1A depicts a standard mechanical design of a commercially available AMTI multi-axis load cell 100. FIG. 1B depicts the cross-section of the load cell 100 in FIG. 1A. This prior art load call 100 has an annular thin wall sensing region 110, which has a multitude of gages 112 bonded to its outer surface 111. The ends 101, 102 of the load cell 100 are much heavier in order to allow external attachment to the load cell 100 with attachment features 130. The ends 101, 102 provide rigid end constraints for the thin wall cylinder 110. The rigid end constraint is very important in order to produce an acceptable transducer. The thin wall section 110 must be long enough to mount the gages 112 and not have the gages 112 too close to the ends 119 of the thin wall section. Manufacturing considerations usually result in a load cell 100 with at least one end having an axial hole 120 close to the inner diameter of the thin section 110. This greatly reduces the end stiffness and requires a longer end section 101 to raise the end section rigidly. The result is a taller transducer or a shorter one with reduced performance. There are many applications where a shorter transducer is required.

A new technique for shortening the transducer and still maintaining end rigidity has been developed. It is impractical to machine embodiments of the present invention load cell out of one solid piece of stock and advantages are gained from a two-piece construction. FIG. 2A shows a perspective view of a multi-axis load cell 200. FIG. 2A depicts two rigid cylindrical mounting elements 201,202 having mounting features 230 and with a thin-walled sensing region 280 joining the mounting elements. The mounting elements 201,202 have flanges 210a and 210b, respectively, and the flanges are joined together by a weld 270 to form the sensing region.

Figure 2B:
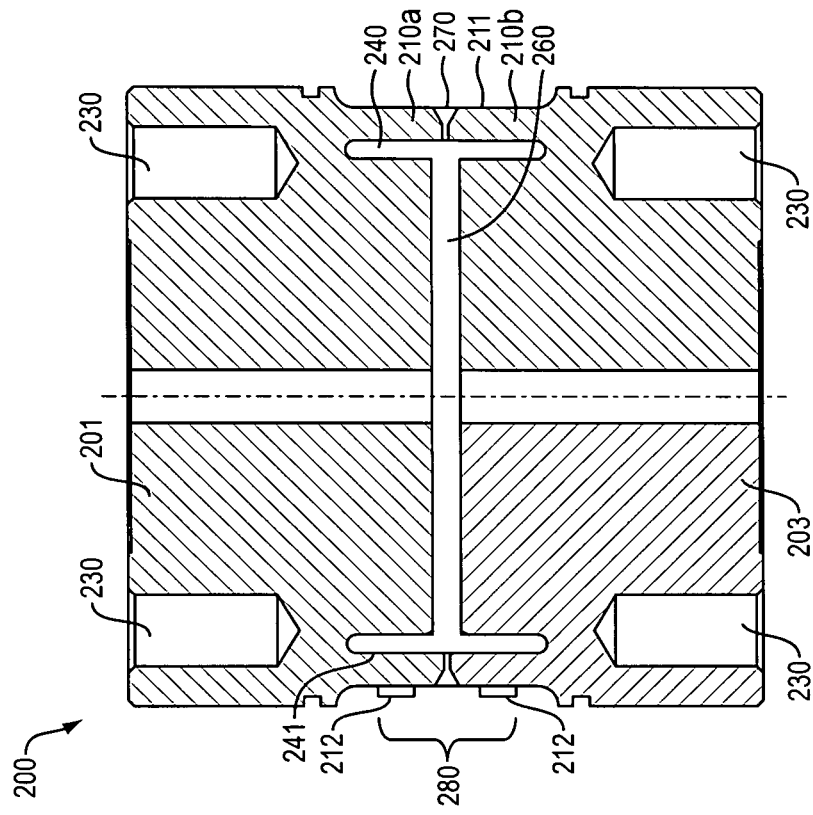
FIG. 2B is a cut-through schematic of a multi-axis load cell embodying the present invention.
Figure 2A:
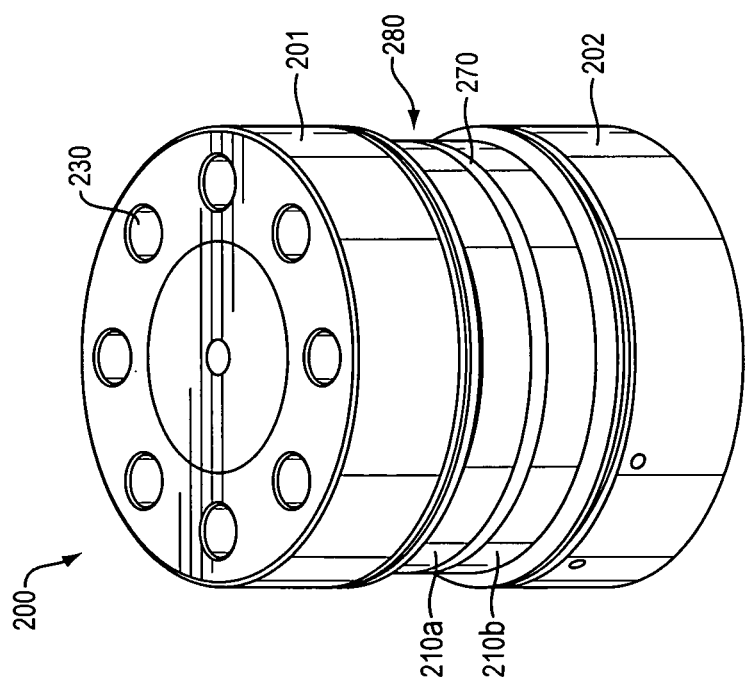
FIG. 2A is a perspective view of a multi-axis load cell embodying the present invention.

FIG. 2B shows a cross section view of the new multi-axis load cell 200. The axis load cell 200 is made in two halves 201,202 that are bonded together by welding or brazing flanges 210a, 210b together at weld 270. The flanges may be bonded by other means such as with adhesive. Together, flanges 210a, 210b form a sensing region 280 with an outside surface 211 for the placement of strain gauges 212. Gauges 212 form at least two sensing circuits with electrical connections (not shown) that provide output signals responsive to forces and moments exerted between mounting elements 201, 202. Flanges 210a, 210b are partially recessed into respective mounting elements 201,202 by placing a groove 240 into an internal surface of each mounting element 201,202. The groove 240 forms a portion of the inside surface 241 of flanges 210a, 210b. Note that only a small amount of material is actually removed from each mounting element 201,202 piece prior to joining, thereby minimizing the volume of internal region 260 while providing a sensing region 280 of sufficient axial length to affix strain gauges 212 or other sensing circuits. The present invention is more efficient from a machining standpoint than prior art designs utilizing a one-piece cylindrical tube by removing the need for internal machining of the mounting elements 201, 202. In addition the performance of the load cell is improved by increasing the mass and rigidity of mounting elements 201,202.

For example, for a given metal, the prior art sensor of FIGS. 1A and 1B weighs 30 pounds and the new design in FIGS. 2A and 2B weighs 45 pounds with the same external dimensions.

The prior art one-piece construction necessitates considerably more machining of typically expensive and tough materials like stainless steel or hardened aluminum alloy. The new design has approximately one sixth the moment induced error than the prior design. The disclosed machining and the performance advantages of the present invention apply to a range of transducer sizes. In the smaller sizes the height reduction becomes the important factor.

Figure 3C:
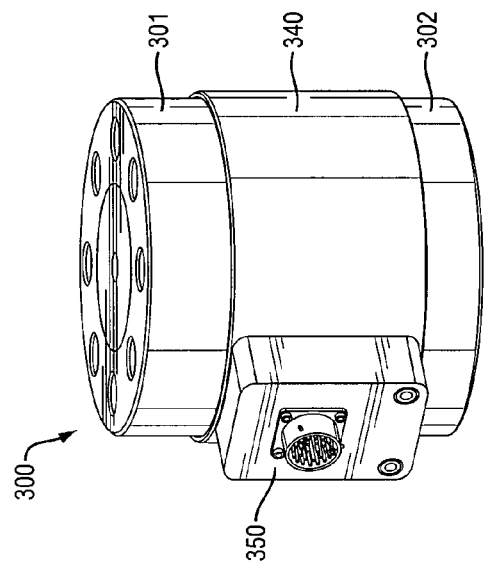
FIGS. 3A-C are three external views of a multi-axis load cell embodying the present invention with an external electrical connection and sheathed sensing region.
Figure 3A:
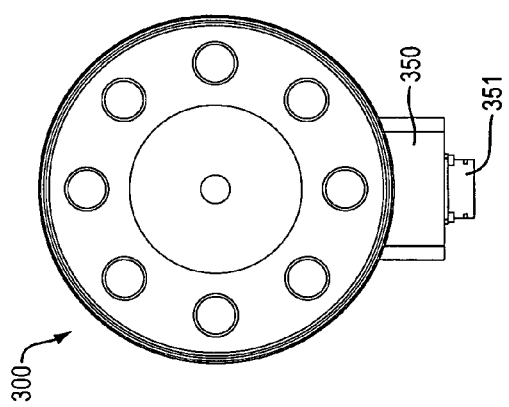
Figure 3B:
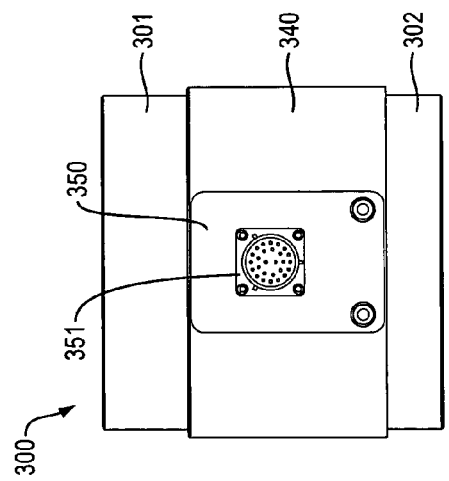

FIG. 3A is top-down view of a multi-axis load cell 300 embodying the prevent invention. An attached housing 350 supports a communication port 351 that provides a standard electrical signal interface between the sensing circuits (not shown) of the load call 300 and a measurement device or other component. FIG. 3B shows a side view of the multi-axis load cell 300 of FIG. 3A. The load cell 300 has a protective sheathing 340 around the sensing region (not shown) between rigid mounting elements 301,302 to protect the attached sending circuitry (not shown). FIG. 3C is a perspective view of the load cell 300 of FIGS. 3A and 3B showing similar features.

Figure 4:
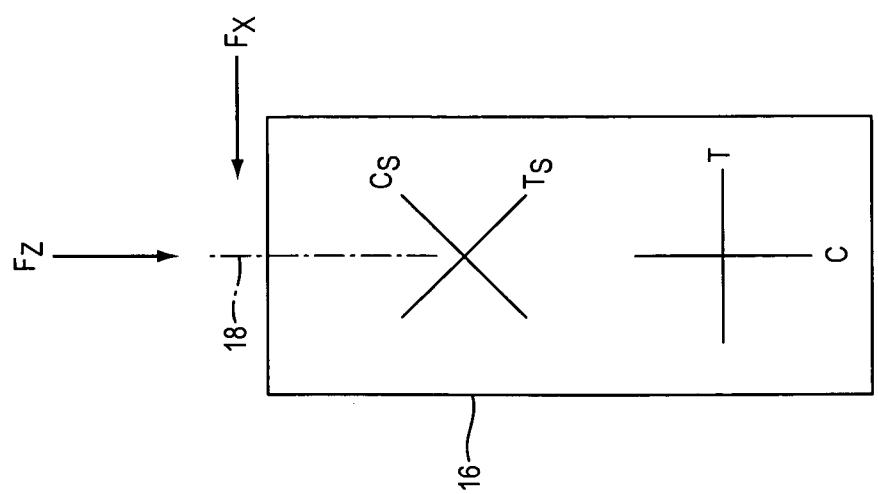
FIG. 4 is a side view of a multi-axis load cell used in accordance with this invention showing strain gage locations for measuring a horizontal force Fx and a vertical force Fz.

Placement of strain gages is conventional and may be as illustrated by FIG. 4 which shows several axes of tension and compression on a cylindrical load cell 16. Under the influence of a horizontal force Fx applied to the top of the load cell, the load cell 16 sees a maximum tension due to shear force along an axis Ts and a maximum compression due to shear along the axis Cs. These axes are at right angles to each other. When placed in adjacent legs in a Wheatstone bridge as in FIG. 5, the electrical outputs resulting from tension and compression along these axes reinforce each other to provide an output of satisfactory sensitivity. By joining selected gages from plural load cells in respective bridges, each of the forces F and moments M can be isolated.

Figure 5:
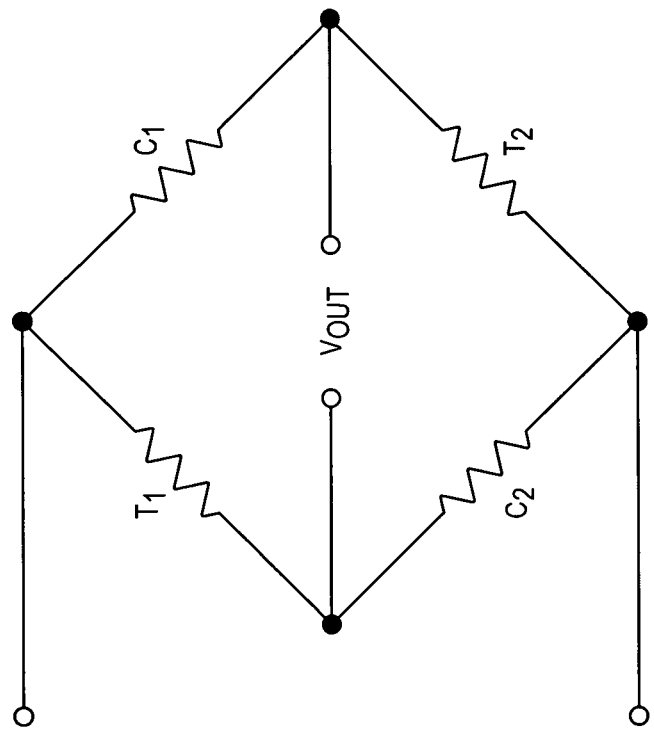
FIG. 5 is an electrical schematic of a Wheatstone bridge in which strain gages are connected.

In a Wheatstone bridge circuit as shown in FIG. 5, equal resistance changes on any adjacent arms of the circuit give zero output. Identical resistance changes on opposite arms of a Wheatstone bridge produce doubled output. Thus for maximum output two opposite arms should undergo one, positive change in resistance while the other two opposite arms should undergo a negative change in resistance.

Any positive vertical forces Fz on the load cell 16 produce equal compressive strains on the axes Ts and Cs. With the strain gages placed along these axes positioned in adjacent legs of the bridge, equal strains of the same type, in this case compression, cancel out to provide no change in electrical output from the bridge.

By placing the shear strain gages along the neutral axis 18 of the load cell 16, any bending of the load cell about the Y-axis results in zero average strain in each of the shear gages. As a result, the net resistance of each gage does not change and the bridge provides no change in output. A tubular load cell is particularly suited to assuring that all strain gages are positioned along an appropriate neutral axis of the cell. Any forces in the Y-direction (into or from the page of FIG. 4) are seen as zero shear. Any moment about the X-axis is seen by the shear gages on the outer face of the cylindrical load cell 16 as a vertical force that is equal compression or tension along each axis.

By placing stacked strain gages in adjacent legs of a bridge, temperature compensation is provided. Any change in resistance of one leg due to temperature changes are also seen by an adjacent leg and the equal changes in resistance of adjacent legs cancel each other in the bridge output.

The sensitivity of a shear strain element is inversely proportional to the cross sectional area of the body under stress. Thus, the cross sectional area of the load cell 16 in a horizontal plane should be held to a minimum. On the other hand, to obtain a stiff load cell, which provides a high natural frequency, a thin rod would not be feasible. To provide a small cross sectional area along with stiffness and strength, a tubular load cell is ideal.

Vertical forces are measured by measuring strain along an axis C. That measurement can be reinforced by adding the Poisson strain along the axis T. Poisson strain is a strain which occurs in the direction perpendicular to the primary strain and is of an opposite type. For aluminum, that strain is approximately −0.32 times the primary strain. By connecting a Poisson strain gage on an adjacent leg of a Wheatstone bridge, that measured strain reinforces a readout of compressive strain along the axis C.

By placing a stacked rosette gage on the opposite side of the cylindrical load cell, 180 degrees from the axes T and C shown in FIG. 4, any bending of the load cell about the X-axis is seen by the vertical gage of one rosette as compression and by the vertical gage of the other stacked rosette as tension. By placing the vertical strain gages which are displaced by 180 degrees on opposite legs of a bridge, those opposite strains cancel each other in the electrical output so that a moment about the X-axis is not measured. In compression of the load cell, however, both strain gages along the vertical axes C are in compression, and because the gages are on opposite arms of a bridge, their output is reinforced.

Any moments about the Y-axis or Z-axis of FIG. 4 and any horizontal forces will not be seen by the gages on axes T and C. Because the gases are along the neutral axis 18, the net resistances of the gages along the T and C axes do not change with bending about the Y-axis.

The applied moments Mx and My are obtained by proper combinations of specific vertical strain measurements in a Wheatstone bridge such that forces not being measured are cancelled. The moment Mz is measured as a combination of side forces on the several load cells. Side forces other than those resulting from moments are cancelled out in the bridge circuits.

Figure 6:
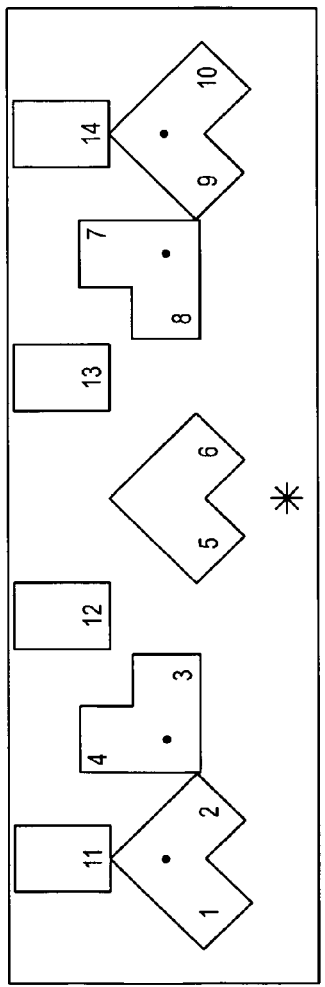
FIG. 6 is a layout of strain gages on an unwrapped cylindrical load cell.
Figure 7:
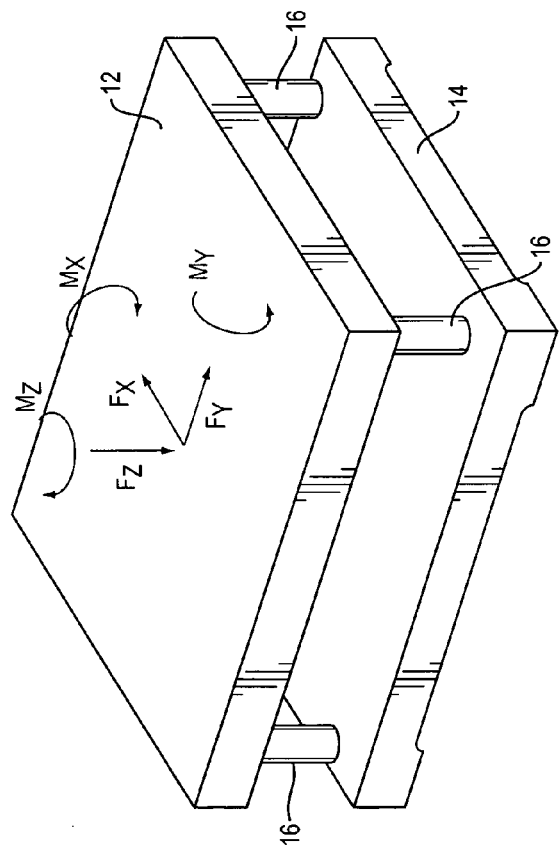
FIG. 7 is a perspective view of a simple force platform comprising multi-axis load cells in accordance with this invention.

One arrangement of strain gages on each of four load cells is illustrated by FIG. 6 with reference to FIG. 7. FIG. 7 illustrates generally a force plate construction wherein a top plate 12 and a bottom plate 14 are located in spaced apart relation by load cells 16 arranged at the corners. The forces F and moments M typically measured by the platform are illustrated in FIG. 7. The strain gages are shown on an unwrapped cylindrical load cell as if mounted on tape of a length which matches the circumference of the load cell, which tape can be placed about the cell. The asterisk shown in the layout of FIG. 6 would be positioned toward the bottom of each cell pointing toward the corner of the platform 12. The gages include three stacked rossettes 1,2; 5,6 and 9,10 for measuring shear strains. Stacked rossettes 3,4 and 7,8 measure vertical compression and tension and Poisson tension and compression. Gauges 11 to 14 measure tension and compression along the vertical axes for measuring Mx and My. The strain gages are connected electrically in a Wheatstone bridge of FIG. 5 in order to measure the forces Fx, Fy and Fz and the moments Mx, My and Mz of FIG. 7.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A multi-axis load cell comprising:
   first and second rigid mounting elements bonded together in a two-piece construction, each of the first and second rigid mounting elements having an internal end and an external end;
   at least one of the rigid mounting elements having an annular flange at the perimeter of the internal end of the element, the mounting element with flange being of one-piece, the annular flange extending a length parallel to a central axis, the flange terminating at an internal end surface;
   the internal ends of the first and second elements being bonded together at the internal end surface of the annular flange of the at least one rigid mounting element, the flange forming a sensing region between the first and second rigid mounting elements.

2. The multi-axis load cell of claim 1, wherein the first and second rigid mounting elements are rigid cylindrical mounting elements, the annular flange being concentric with the at least one rigid mounting element having the annular flange.

3. The multi-axis load cell of claim 2, wherein the internal ends of the first and second cylindrical elements are bonded concentrically.

4. The multi-axis load cell of claim 1, wherein the internal ends of the first and second rigid mounting elements are bonded together by welding or brazing the internal end surface of the annular flange of the at least one rigid mounting element.

5. The multi-axis load cell of claim 1, wherein the at least one of the rigid mounting elements having a flange includes a cylindrical groove therein, the cylindrical groove defining at least a portion of an inside surface of the annular flange.

6. The multi-axis load cell of claim 5, wherein the cylindrical groove is formed by trepanning the internal end of the at least one of the rigid mounting elements having an annular flange.

7. The multi-axis load cell of claim 1 wherein the first and second rigid cylindrical mounting elements have respective first and second annular flanges bonded at their end surfaces, the first and second annular flanges forming the sensing region.

8. The multi-axis load cell of claim 1, wherein the sensing region has an outside surface directed away from the central axis of the first and second elements, the outside surface of the sensing region supporting:
   a first sensing circuit formed of a first set of sensing elements and providing a first output signal responsive to a first force exerted between the first and second rigid mounting elements in a first direction, and
   a second sensing circuit formed of a second set of sensing elements and providing a second output signal responsive to a second force exerted between the first and second rigid mounting elements in a second direction, wherein the second direction is substantially perpendicular to the first direction.

9. The multi-axis load cell of claim 8, further wherein the first output signal is responsive to a first moment of the first and second rigid mounting elements.

10. The multi-axis load cell of claim 8, further wherein the second output signal is responsive to a second moment of the first and second rigid mounting elements.

11. The multi-axis load cell of claim 8, further including at least one electrical connector receiving the first and second output signals, the electrical connector configured to interface the multi-axis force transducer with an external electric device.

12. The multi-axis load cell of claim 1, wherein at least one of the first and second rigid mounting elements includes mounting features.

13. The multi-axis load cell of claim 1, wherein the internal and external ends of the first rigid mounting element comprises a first pair of surfaces facing in opposite directions and the internal and external ends of the second rigid mounting element comprises a second pair of surfaces facing in opposite directions, the second set of surfaces being substantially parallel to the first set of surfaces.

14. The multi-axis load cell of claim 13, wherein the first and second rigid mounting elements have about equal stiffness.

15. The multi-axis load cell of claim 13, wherein the sensing region has a stiffness substantially less than the stiffness of the first and second rigid mounting elements.

16. The multi-axis load cell of claim 14, wherein the axial distance between the first pair of surfaces is about equal to the axial distance between the second pair of surfaces.

17. A method of manufacturing a multi-axis load cell, the method comprising:
   providing first and second rigid mounting pieces, the first and second rigid mounting pieces each having an axis between an internal end and an external end;
   forming an annular flange in the perimeter of the internal end of the first rigid mounting piece, the annular flange extending in a direction parallel to the axis of the first rigid mounting piece and terminating at an internal end surface;
   bonding the internal end surface of the annular flange to the internal end of the second rigid mounting piece in a two-piece construction, the annular flange forming a sensing region.

18. The method of claim 17, wherein the annular flange is a first annular flange, the method further including:
   forming a second annular flange in the perimeter of the internal end of the second rigid mounting piece, the second annular flange extending in a direction parallel to the axis of the second rigid mounting piece and terminating at an end surface;
   wherein bonding the end surface of the first annular flange to the internal end of the second rigid mounting piece includes bonding the end surface of the first annular flange to the end surface of the second annular flange, the sensing region comprising the first and second annular flanges.

19. The method of claim 17, wherein the first and second rigid mounting pieces are first and second cylindrical mounting pieces; and bonding the end surface of the first annular flange to the end surface of the second annular flange comprises:
   welding or brazing the end surface of the first annular flange to the end surface of the second annular flange.

20. The method of claim 17, wherein the first and second rigid mounting pieces are first and second cylindrical mounting pieces; and forming an annular flange includes:
   trepanning a cylindrical groove in the internal end of the first rigid mounting piece, the cylindrical groove defining at least a portion of an inside surface of the annular flange.

21. The method of claim 17 further comprising mounting a sensing circuit on an outside surface of the sensing region.

22. The multi axis load cell of claim 1, wherein the sensing region has an outside surface directed away from the central axis of the first and second elements, the outside surface of the sensing region supporting a sensing circuit that provides an output signal responsive to a force exerted between the first and second rigid mounting elements.

* * * * *